United States Patent
DeJong et al.

(10) Patent No.: US 8,084,075 B1
(45) Date of Patent: *Dec. 27, 2011

(54) PROCESS FOR PREPARING A MELON EXTRACT AND CONCENTRATE AND PRODUCT PRODUCED BY THE PROCESS

(75) Inventors: Bruce D. DeJong, Richland, WA (US); Eric A. Johnson, Richland, WA (US); David L. Luther, West Richland, WA (US); Gordon R. Taylor, Prosser, WA (US)

(73) Assignee: Milne Fruit Products, Inc., Prosser, WA (US)

( * ) Notice: Subject to any disclaimer, the term of this patent is extended or adjusted under 35 U.S.C. 154(b) by 1453 days.

This patent is subject to a terminal disclaimer.

(21) Appl. No.: 11/469,220

(22) Filed: Aug. 31, 2006

Related U.S. Application Data (60) Provisional application No. 60/712,985, filed on Aug. 31, 2005.

(51) Int. Cl.
*A23L 2/02* (2006.01)

(52) U.S. Cl. ........ 426/615; 426/481; 426/518; 426/520; 426/599; 426/655

(58) Field of Classification Search .................. 426/615, 426/655, 599, 481, 518, 520
See application file for complete search history.

(56) References Cited

U.S. PATENT DOCUMENTS

| 2,631,628 | A | * | 3/1953 | Martin | 99/474 |
| 6,589,581 | B1 | | 7/2003 | Marks et al. | |
| 2007/0148297 | A1 | * | 6/2007 | Bell et al. | 426/520 |

FOREIGN PATENT DOCUMENTS

KR 2001077630 A * 8/2001

* cited by examiner

*Primary Examiner* — Helen F Heggestad
(74) *Attorney, Agent, or Firm* — Price Heneveld LLP (57) ABSTRACT

The process of producing a melon extract by the following steps: providing at least one whole melon comprising flesh; steaming the outside surface of the whole melon to thereby soften the outside surface of the melon and remove microbials from the outside surface of the melon; reducing the size of the whole melon to form melon pieces; and introducing the melon pieces into the first finisher and utilizing the finisher to remove the melon flesh from the melon pieces such that at least from about 1/16 inch of flesh remains on the melon pieces and form melon extract from the flesh that is removed from the melon pieces.

23 Claims, 10 Drawing Sheets

PROCESS FOR PREPARING A MELON EXTRACT AND CONCENTRATE AND PRODUCT PRODUCED BY THE PROCESS

CROSS-REFERENCE TO RELATED APPLICATION

This application claims benefit of provisional application Ser. No. 60/712,985, filed Aug. 31, 2005, entitled WATERMELON EXTRACTS AND PROCESS OF PRODUCING THE WATERMELON EXTRACTS, the entire contents of which are incorporated herein by reference. This application is related to the following co-assigned, co-invented applications filed on even date herewith: Ser. No. 11/469,151, entitled APPARATUS FOR PREPARING MELON JUICE CONCENTRATE; Ser. No. 11/469,168, entitled APPARATUS FOR SEPARATING MELON FLESH FROM RIND; and Ser. No. 11/469,192, now U.S. Patent No. 7,807,209, entitled WATERMELON JUICE PRODUCTS AND FOOD PRODUCTS PRODUCED WITH THE JUICE PRODUCTS.

BACKGROUND OF THE INVENTION

The present invention generally relates to processes for producing melon juice, and/or juice concentrate and also the juice extract or concentrate itself.

Natural watermelon extract, including watermelon juice and watermelon juice concentrate, should ideally have a strong watermelon flavor identity and a red color. Unfortunately, to date, previously produced watermelon extract exhibited an "off" flavor primarily as a result of a fishy odor and flavor. It is presently believed that previously produced juices have been produced using the entire watermelon, including the rind, and typically have an amber or yellow color.

Some currently available watermelon juice products include additives, such as colorants, sugars, and flavors to mask the fishy taste and odor. Some watermelon juice products also include thickening agents. One such thickening agent is carrageenan, a phycocolloid derived from seaweed.

The red flesh portion of the watermelon is the portion consumers typically eat. Therefore, watermelon juice is preferably red in color. The red color desired in watermelon juice can be both observed and quantified. Cloudy watermelon juice can be measured using an instrument called a HUNTER™ colorimeter. The HUNTER™ colorimeter designates color measurements into three categories, L, A and B, and assigns a value to each. The L value measures the "brightness" of the juice, the A value measures the "redness," and the B value measures the "brown" of a juice. Using these values, different cloudy watermelon juices can be compared and contrasted on a quantitative basis, providing real numbers in the comparison.

There are generally two types of watermelon juice, cloudy and clarified. A cloudy fruit juice is generally unfiltered with the cloudiness coming from natural fruit material. In the case of watermelon juice, the cloudiness is primarily due to small pieces of flesh remaining in the cloudy juice. Clarified or clear juice is generally derived from cloudy juice. A HUNTER™ colorimeter is not typically used to quantify color in clarified watermelon juice. Instead, color of a clarified juice extract is typically expressed at percent transmittance at a particular light wavelength.

There is a significant need for an easily manufactured, natural watermelon extract, such as a juice or a concentrate, having a red color and a strong watermelon flavor identity and a method for producing such an extract. More broadly, there is a significant need for melon extract, such as a juice or concentrate from watermelon, cantaloupe, honeydew melon, or similar fruit with rind.

SUMMARY OF THE INVENTION

One aspect of the present invention generally includes the process of producing a melon extract by the following steps: providing at least one whole melon comprising flesh; steaming the outside surface of the whole melon to thereby soften the outside surface of the melon and remove microbials from the outside surface of the melon; reducing the size of the whole melon to form melon pieces; and introducing the melon pieces into the first finisher and utilizing the finisher to remove the melon flesh from the melon pieces such that at least from about $\frac{1}{16}$ inch of flesh remains on the melon pieces and form melon extract from the flesh that is removed from the melon pieces.

Another aspect of the present invention includes watermelon extract produced by the process using the following steps: providing at least one whole watermelon comprising flesh; steaming the outside surface of the whole watermelon to thereby soften and disinfect the melon; reducing the size of the whole watermelon to form watermelon pieces about 16 inches square or smaller; and introducing the watermelon pieces into the first finisher and utilizing the finisher to remove the watermelon flesh from the watermelon pieces such that at least from about $\frac{1}{16}$ inch of flesh remains on the watermelon pieces and form watermelon extract.

These and other features, advantages, and objects of the present invention will be further understood and appreciated by those skilled in the art by reference to the following specification, claims, and appended drawings.

BRIEF DESCRIPTION OF THE DRAWINGS

The accompanying drawings, which are incorporated in, and constitute a part of, the specification illustrate several embodiments of the invention and together with the description, serve to explain the objects, advantages, and principles of the invention.

DETAILED DESCRIPTION OF PREFERRED EMBODIMENT

Figure 1:
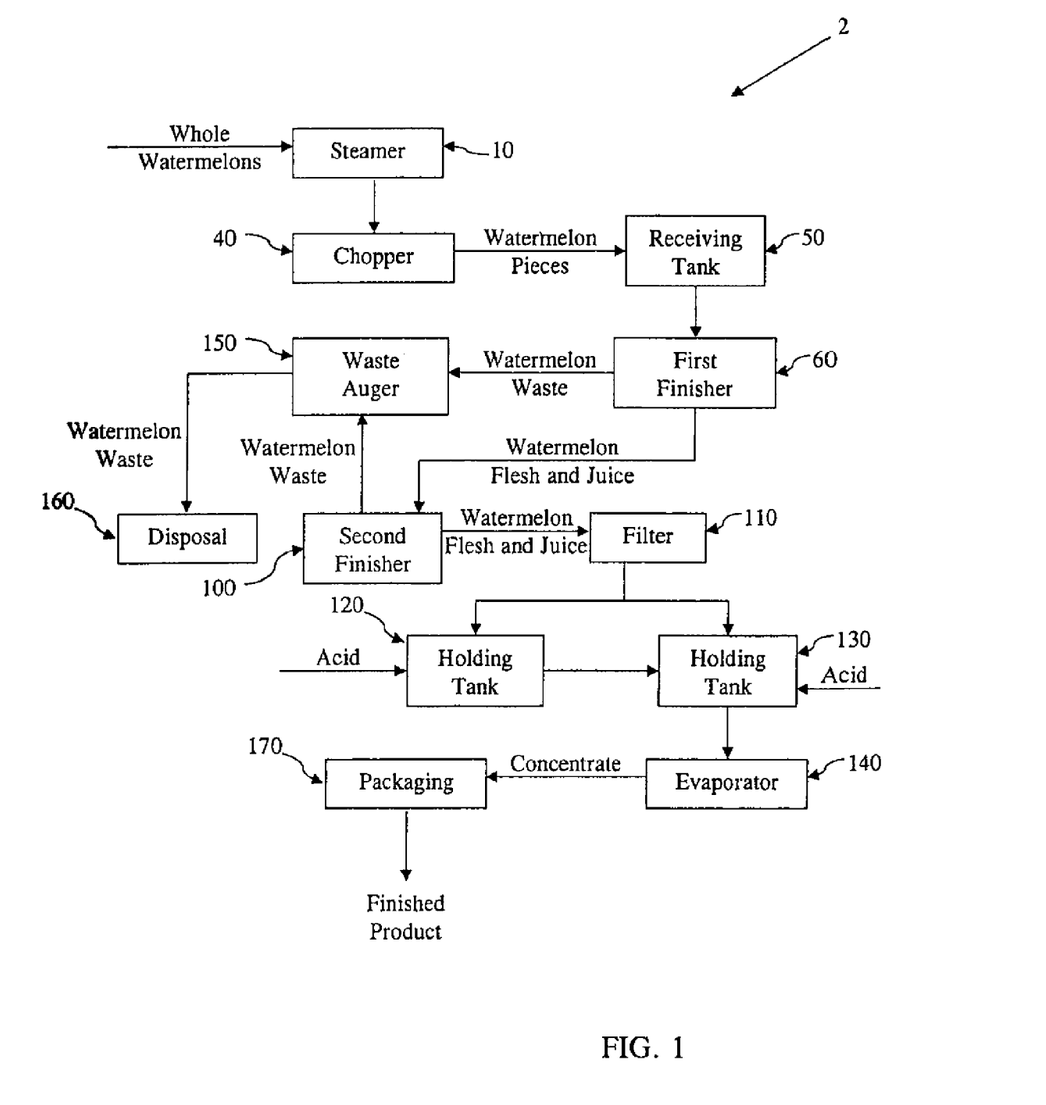
FIG. 1 is a flow diagram illustrating a process of producing a cloudy watermelon concentrate in accordance with the present invention.

FIG. 1 generally shows a process for producing a cloudy watermelon juice extract, in particular a concentrate, in accordance with the present invention. The process generally includes steaming whole watermelons that are introduced into a steamer 10 where steam is applied to the exterior surface of the whole watermelons. Next, the steamed whole watermelons are typically transferred to a chopper 40. The chopper serves to reduce the size of the watermelon pieces. These watermelon pieces typically comprise pieces of watermelon flesh only, pieces of watermelon rind only, and pieces of watermelon flesh attached to watermelon rind. At this point in the process, the watermelon flesh includes watermelon juice. The watermelon pieces are sent to a receiving tank 50. From the receiving tank, the watermelon pieces go to a first finisher 60, where the watermelon flesh is substantially separated from the watermelon rind. In the first finisher 60, an at least portion of watermelon juice is extracted from the watermelon flesh to form a mixture. The substantially separated watermelon flesh and juice mixture is transferred to a second finisher 100. The watermelon rind goes to the waste auger 150, where it is removed and sent for disposal 160. The second finisher 100 generally substantially removes any watermelon seeds present in the mixture of watermelon flesh and juice. Once the seeds are removed, the mixture of watermelon flesh and juice is sent to a filter device 110, where the watermelon juice is substantially separated from the watermelon flesh. The watermelon juice is transferred to holding tanks 120 and 130 where edible acid is typically added to adjust the pH of the juice. Once the desired pH level is achieved, the watermelon juice is optionally sent to an evaporator 140, where water, typically substantially all of the water, is removed to form a watermelon concentrate. The watermelon concentrate is packaged 170 and sent out as finished product.

Figure 2:
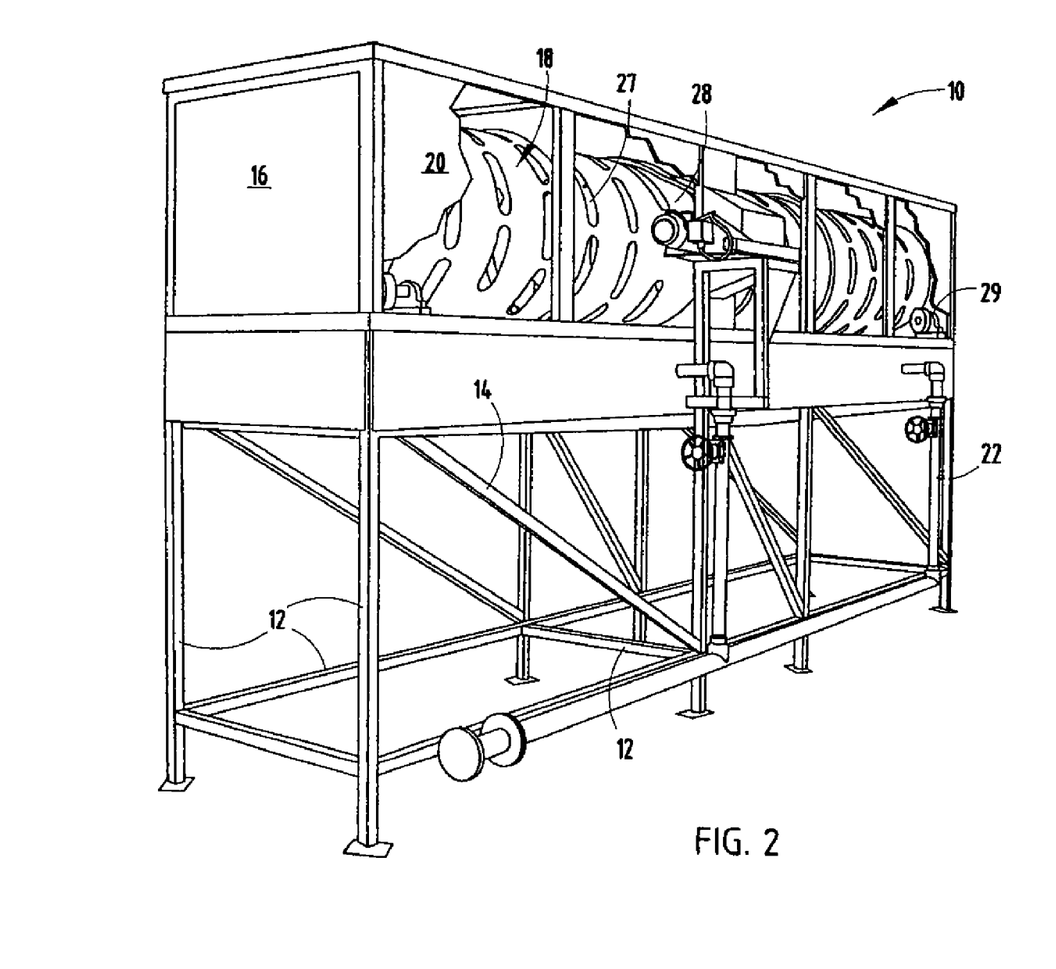
FIG. 2 is a perspective view of a steamer of the present invention used in the process of the present invention.

FIG. 2 shows the steamer 10 of the present invention. The steamer typically includes a plurality of vertical supports 12 and cross support members 14, which support the housing 16 of the steam cylinder assembly 18. The housing 16 has removable access doors 20, which are primarily shown as cut away portions in FIG. 2. The support members 12, 14, housing 16, and access doors 20 are typically manufactured from steel. The steamer 10 typically further includes steam supply lines 22, which feed the steam lines 24 typically disposed in a parallel manner in the bottom quarter of the housing 16 and spaced below the steamer cylinder assembly 18 with the steam jets 26 directed substantially upward. The steam lines 24 and jets 26 could be positioned anywhere in the housing 16 so long as steam is applied to the watermelons traversing the steam cylinder assembly 18.

Figure 2A:
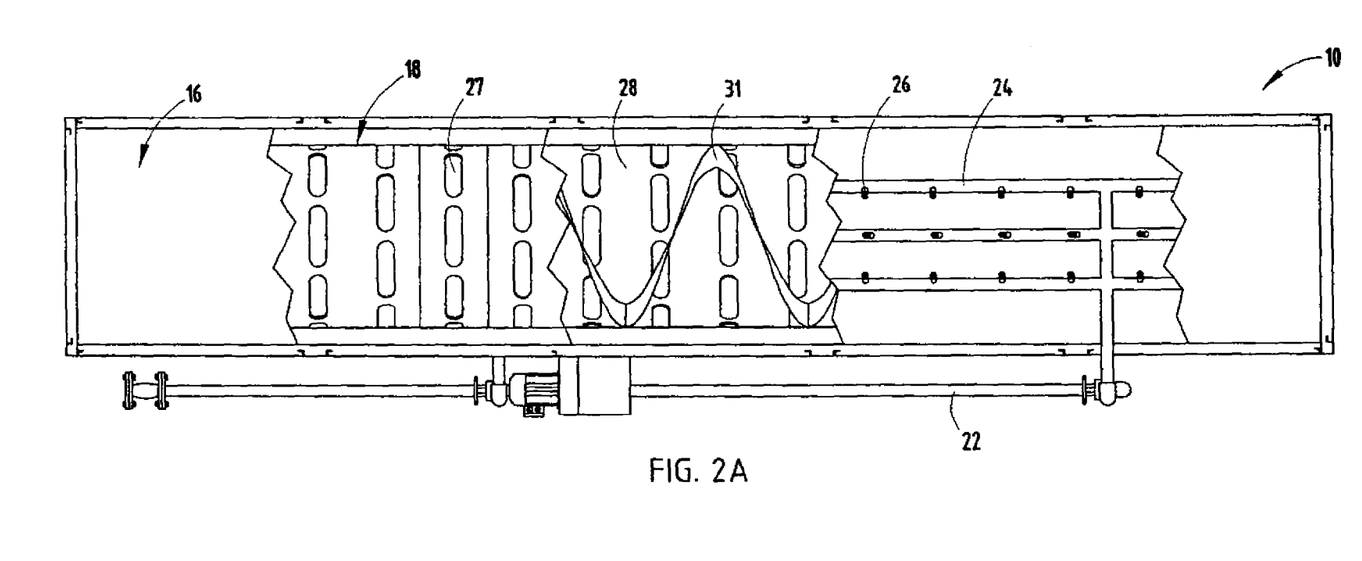
FIG. 2A is a cross-sectional view of the steamer of the present invention showing an outer cylinder, auger, and steam pipes inside the steamer of FIG. 2 at different levels.
Figure 2B:
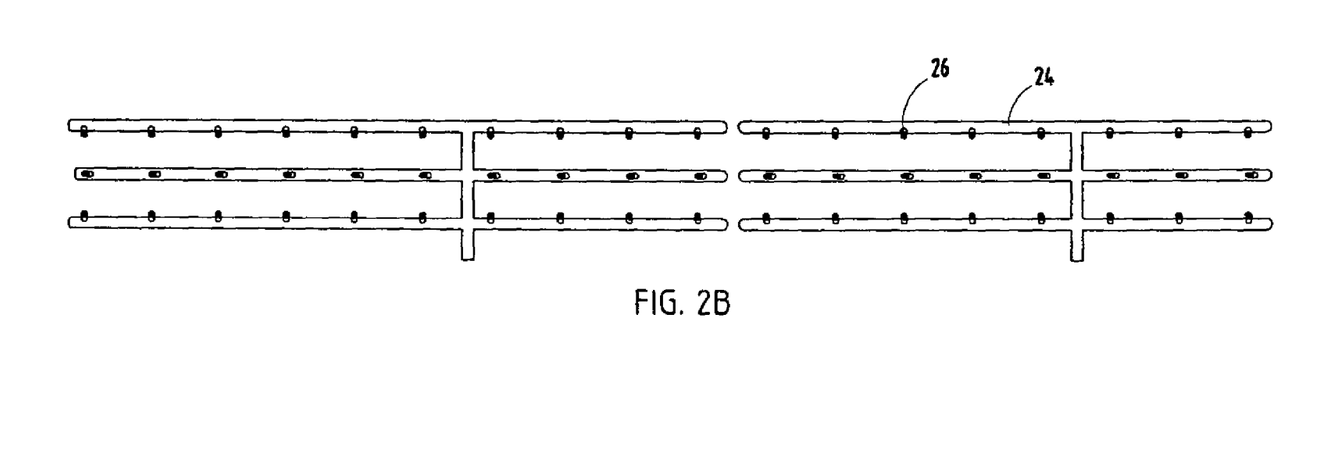
FIG. 2B is an expanded view of the steam pipes of the steamer of FIG. 2A.
Figure 2C:
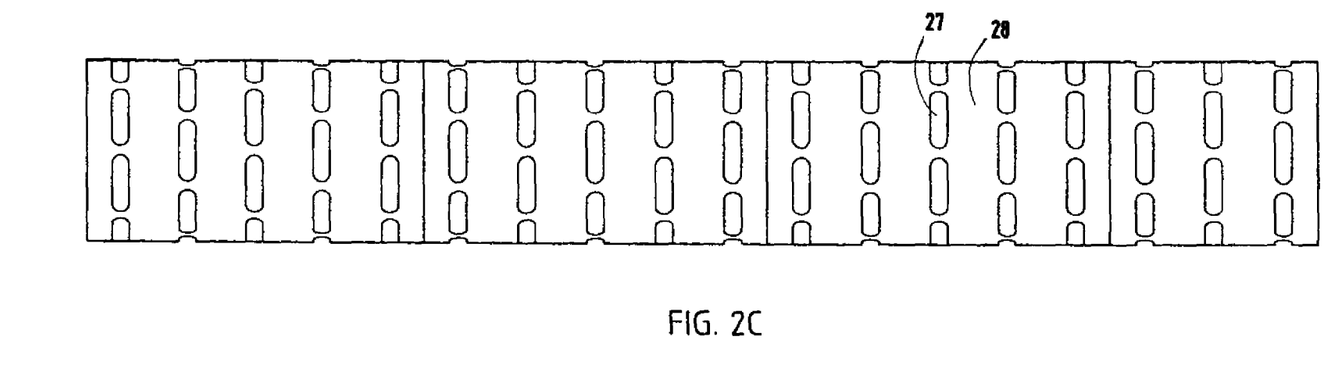
FIG. 2C is an expanded view of an outer cylinder as shown in the steamer of FIG. 2A.

The steam cylinder assembly 18 is typically mounted within the housing 16 and includes a main cylinder frame 28 that typically is mounted above the steam lines on roller supports 29, which rotate and are mounted on the inside surface of the housing 16. The steam cylinder assembly 18 is operably connected, typically by a drive belt assembly, to a motor 30, which provides the drive force necessary to rotate the steam cylinder assembly 18. The belt is typically frictionally engaged to the outside surface of main cylinder frame 28. The main cylinder frame 28 typically has a plurality of apertures 27 (FIG. 2A). The apertures 27 as shown in FIG. 2C are typically arranged around the circumference of the cylinder and form parallel rings which extend down the length of the cylinder. Typically, the apertures 27 are from about 2 inches to about 8 inches wide and from about 4 inches to about 14 inches long. More typically, the apertures are from about 2½ inches to about 6 inches wide and from about 8 inches to about 12 inches long. Most typically, the apertures are about 3⅛ inches wide and about 11 inches long. The parallel rings of the apertures are typically spaced from about 1 inch to about 12 inches apart, more typically from about 7 inches to about 11 inches apart, and most typically about 8⅞ inches apart. While the arrangement of the apertures 27 in the main cylinder frame 28 of the steamer 10 described is that of a preferred embodiment, those skilled in the art will recognize that other arrangements will also work in the steamer of the present invention. The preferred dimensions of the apertures prevent watermelon fragments that may break off in the steamer from falling through the apertures. The apertures 27 further function to provide access points for the steam from the steam lines to contact the exterior surface of the watermelon traversing the main cylinder frame.

Typically, the main cylinder frame 28 has a length of from about 18 feet to about 19 feet, and most typically has a length of 18.5 feet. The main cylinder frame 28 typically has a diameter of from about 24 inches to about 36 inches, more typically from about 30 inches to about 34 inches, and most typically a diameter of about 32 inches.

Figure 2D:
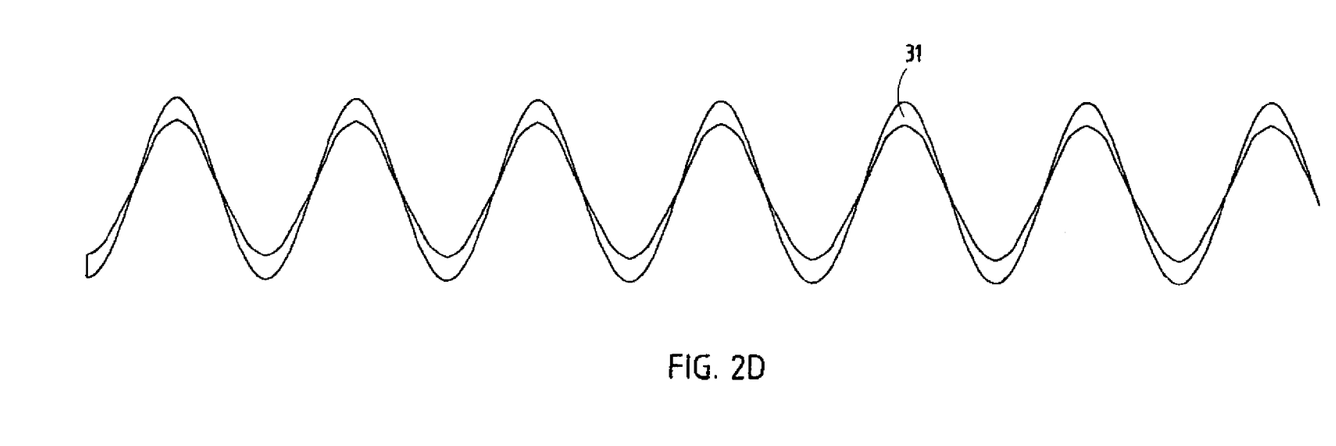
FIG. 2D is an expanded view of the reverse auger of a steamer of FIG. 2A.
Figure 2E:
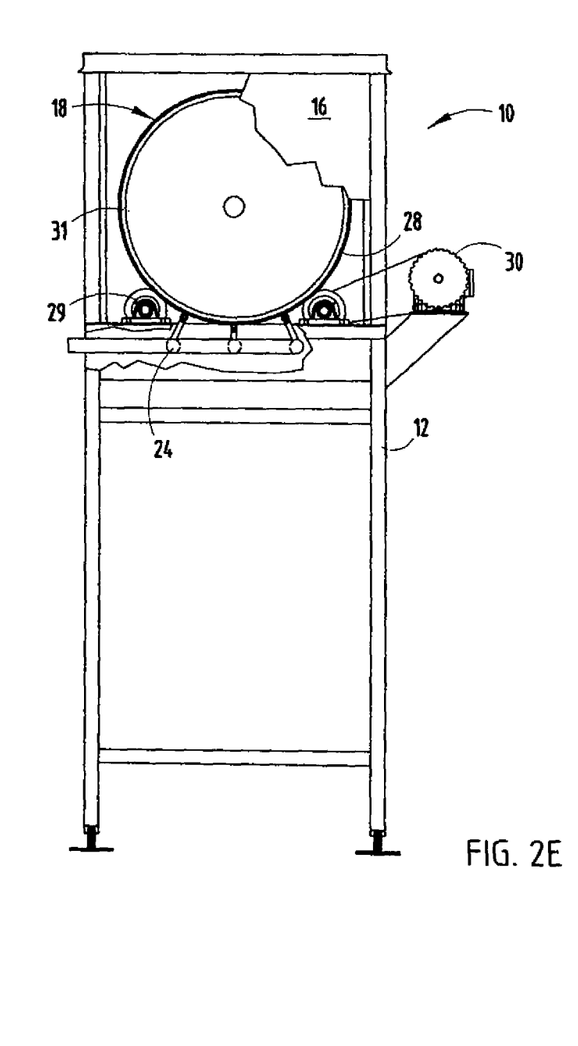
FIG. 2E is a side elevational view of a steamer of the present invention.

As shown in FIGS. 2A, 2D, and 2E, inside the main cylinder frame 28 includes a reverse auger 31. In operation, the whole watermelons are introduced into one end of the cylinder assembly 18 of the steamer 10 and are conveyed down the length of the cylinder by the auger 31 to the opposite end. Steam is introduced through the steam head on steam jets 26 at a typical temperature of from about 212° F. to about 338° F., more typically from about 220° F. to about 320° F., and most typically from about 260° F. to about 310° F. The whole watermelons are typically held inside the steamer from about 30 seconds to about 90 seconds, more typically from about 45 seconds to about 70 seconds, and most typically from about 55 seconds to about 60 seconds. As the whole watermelon travels through the steamer 10, the outside surface of the watermelon is softened and disinfected. The steaming of the outside surface removes microbials that otherwise may cause the watermelon extract to contain an unacceptable total plate count (TPC) of bacteria. It is presently believed that the fact that watermelon grows on the ground as opposed to in, for example, a tree, at least partially causes the increased tendency for higher bacteria levels in watermelon extract when the exterior of the melons are not steamed or otherwise cleansed prior to being subject to further processing in the extracting process.

Figure 3:
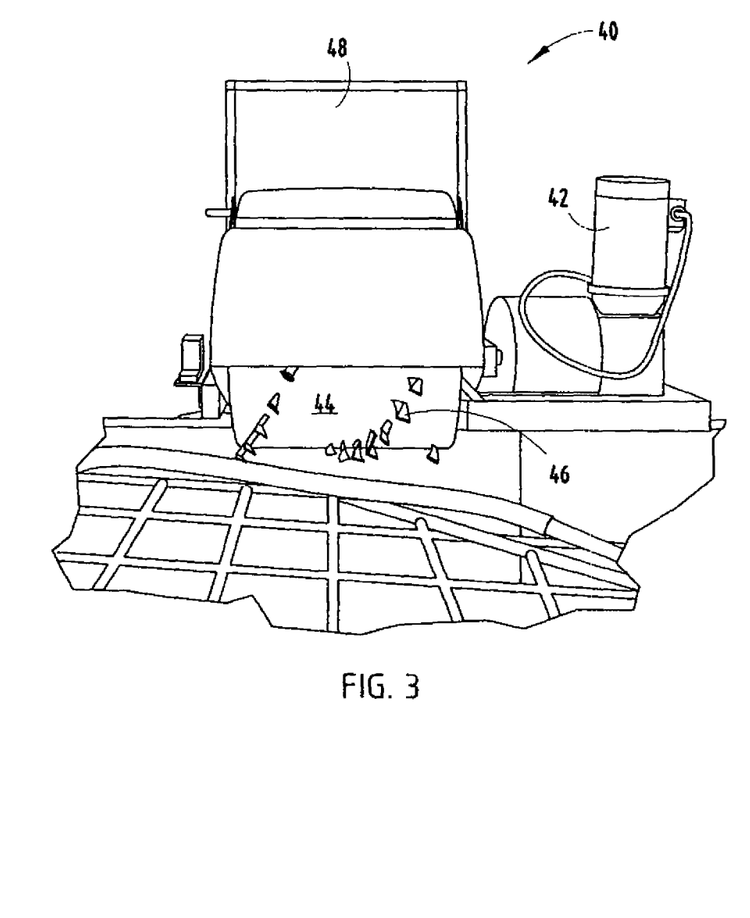
FIG. 3 is an elevated perspective view of a chopping apparatus of the present invention.

After leaving the steamer 10, the whole watermelons are conveyed to a chopper 40. In operation, a motor 42 drives a cylindrical drum 44 with a plurality of teeth 46 mounted on the exterior portion of the cylindrical drum 44. A hopper 48 receives the whole watermelons and, through their weight and the teeth on the drum, the whole watermelons are reduced in size. The chopper 40 exerts pressure on the whole watermelon, essentially "crunching" it into pieces. The watermelon pieces formed by the chopper 40 typically include pieces of watermelon flesh only, pieces of watermelon rind only, and pieces of watermelon flesh and rind combined, as well as watermelon juice. Typically, the watermelon pieces are chopped into pieces smaller than about 16 inches square, more typically smaller than about 10 inches square, and most typically smaller than about 8 inches square. One chopper suitable for use may be purchased from Flo-Din. of Moses Lake, Wash. The watermelons are received by and/or otherwise conveyed to one or more receiving tanks 50.

Figure 4:
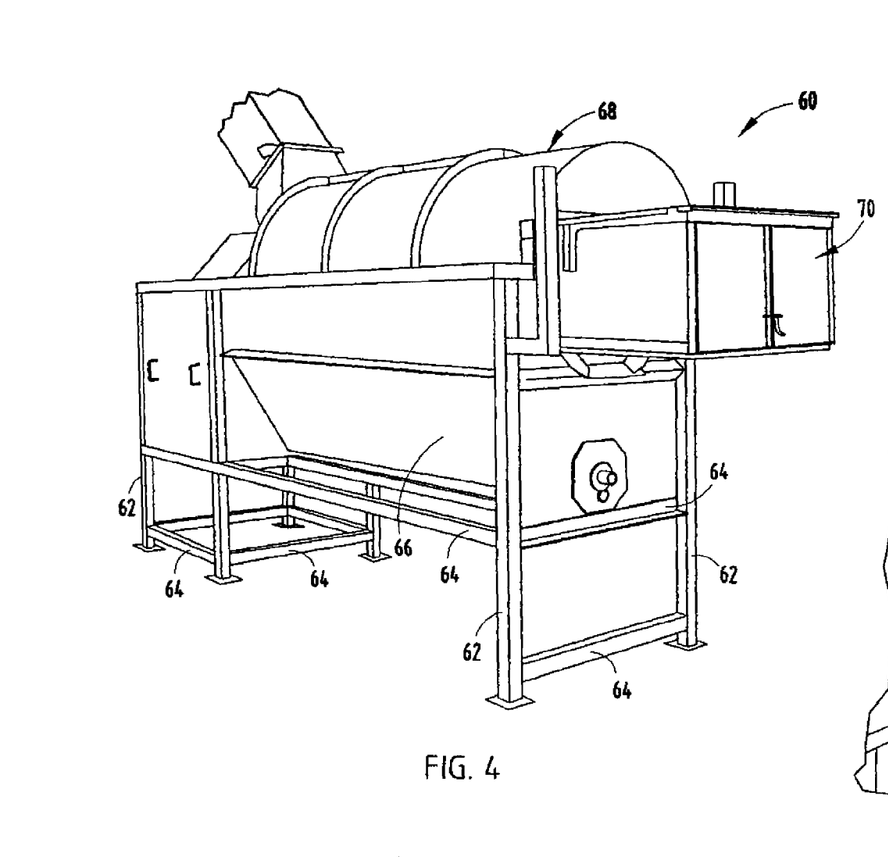
FIG. 4 is a perspective view of a first finisher of the present invention.
Figure 5:
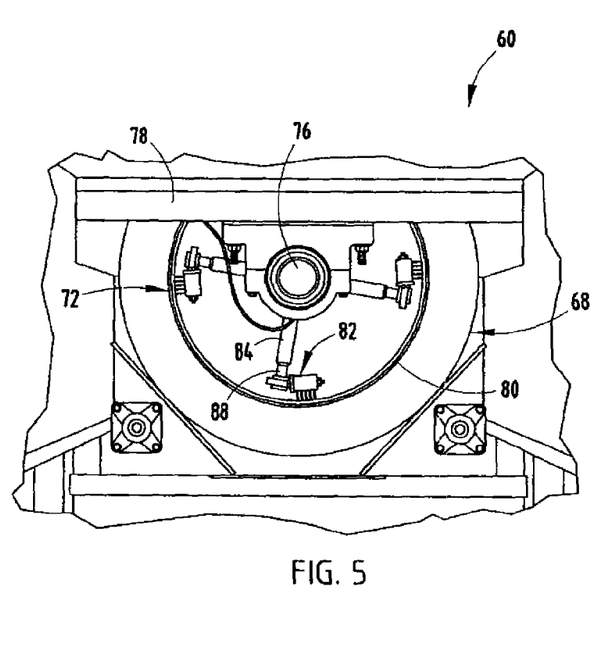
FIG. 5 is a cross-sectional view of the first finisher of the present invention.

Next, the watermelon pieces are conveyed from a receiving tank 50 to a first finisher 60. FIGS. 4, 5, 6 and 6A illustrate an embodiment of the first finisher 60. As shown in FIG. 4, the first finisher 60 generally includes vertical support members 62 and horizontal support members 64. The first finisher 60 further generally includes a receiving chamber 66 that receives the watermelon extract, and at least substantially cylindrical finishing chamber 68 that, along with the drive motor housing 70, houses the finishing cylinder assembly 72 and drive motor (not shown). The motor is typically an electrical motor or gas engine, or other powered actuator. Preferably, the drive for the motor or engine is a variable drive, more preferably a variable frequency drive. Preferably, the motor or engine engages the central shaft 76 of the finishing cylinder assembly 72 to drive rotation of the shaft when the finisher is in operation. One end of the shaft is typically mounted outside of the cylindrical finishing chamber 68 within the drive motor housing 70, typically to horizontal support member 78.

Figure 6:
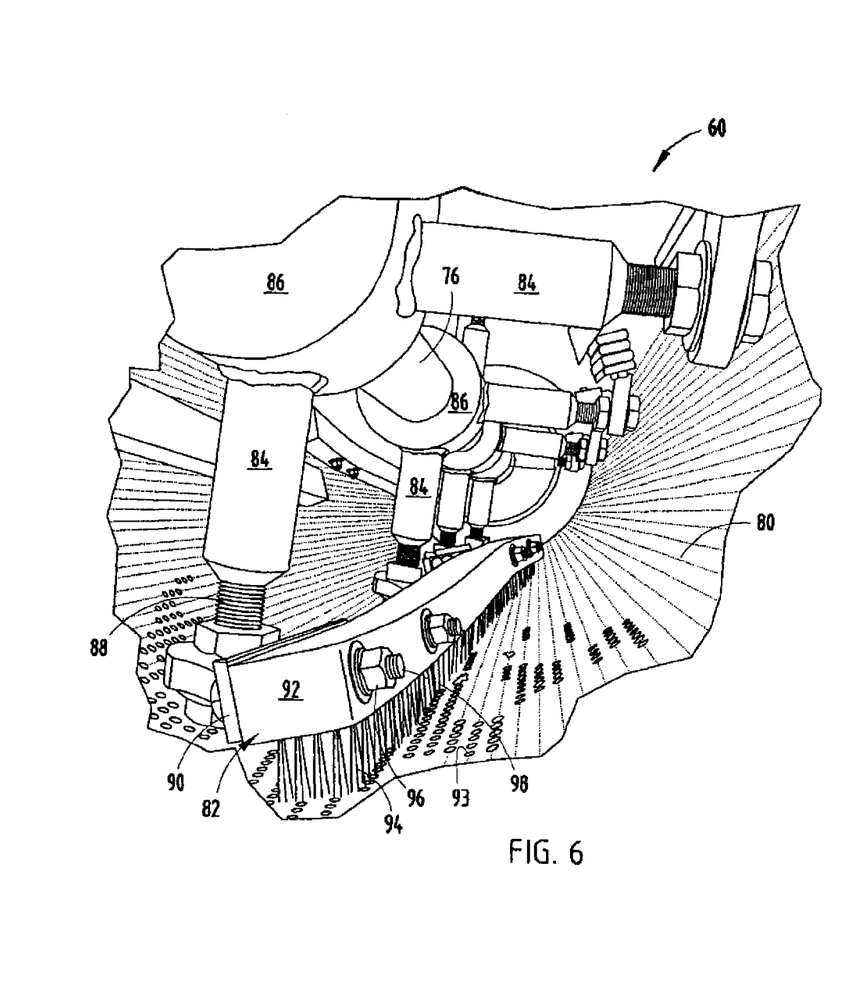
FIG. 6 is an expanded view of the inside of the first finisher of the present invention showing brushes, an inside screen, and rotating arms.
Figure 6A:
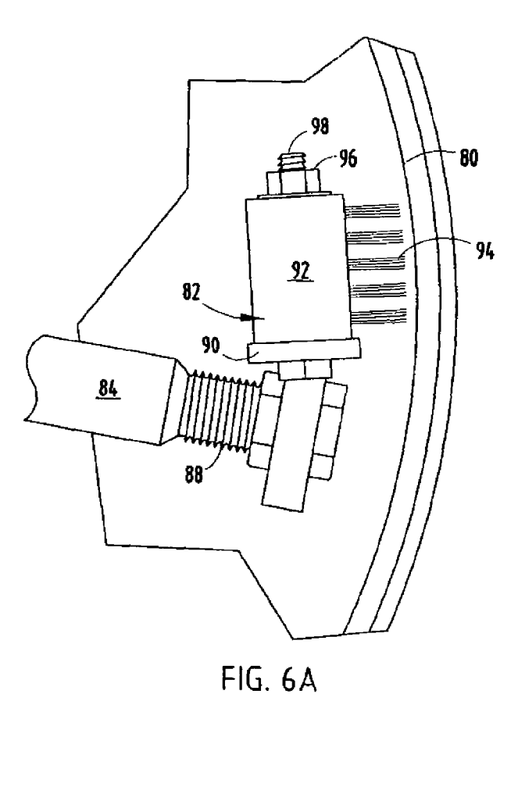
FIG. 6A is an expanded view of the brushes, inside screen, and rotating arm of a first finisher of the present invention, as shown in FIG. 6.

The finishing cylinder assembly 72 generally includes a cylindrical finishing screen 80, which cooperates with the finishing brushes 82 to extract the watermelon extract from the watermelon pieces. The finishing brushes 82 generally include brush support members 90, a body 92, and bristles 94. Typically, the central shaft 76 is at least substantially concentric, preferably concentric within the cylindrical finishing screen 80. Typically, the central shaft 76 has a plurality of radially extending members 84 spaced at substantially 90 degrees from one another, more typically 90 degrees. Preferably, the radially extending members 84 are engaged to central shaft collars 86 by a weld. The central shaft collars 86 engage the central shaft 76. The radially extending members 84 are typically threaded at the distal end 88. The distal end 88 engages brush support members 90, which themselves engage, typically by utilizing a nut 96 and bolt 98 assembly, to the finishing brushes 82 that, as discussed above, generally have a body 92 and bristles 94. Spacers and/or nuts between the brush support members 90 and the bodies 92 of the finishing brushes 82 operate to help regulate the amount of watermelon flesh that is removed from the rind. This can also conceivably be adjusted by adjusting the location of the brush support member 90 on the thread end of the radially extending members 84.

Each of the bristles 94 of the finishing brushes 82 are typically made of a synthetic fiber, such as nylon (a polyamide). Preferably, there are two sets of four at least substantially evenly spaced brushes, more typically spaced at 90 degree intervals about the rotating central shaft 76. Typically there are four brushes that run the length of the cylindrical finishing screen 80. Typically, the cylindrical finishing screen 80 has a total diameter of about 8 inches to about 32 inches, more typically from about 12 inches to about 30 inches, and most typically a diameter of about 24 inches. The distance from the tip bristles 94 of a finishing brush 82 to the surface of the cylindrical finishing screen 80 is from about ¾ inch to about 1 inch. Usually, the leading end of the brush 82 is about 1 inch from the cylindrical finishing screen 80 and the trailing end of the brush 82 is about ¾ inch from the cylindrical finishing screen. This allows for the preferred amount of flesh of the watermelon pieces to be removed from the rind.

Typically, watermelon pieces are introduced into the first finisher at one end of the first finisher (also called an "automated separator device" herein). As the watermelon pieces rotate inside the first finisher, the watermelon flesh attached to the rind substantially separates from the rind. At least a portion of watermelon flesh remains attached to the watermelon rind. Leaving a portion of watermelon flesh on the watermelon rind prevents rind from being removed. Typically, at least about 1/16 inch of watermelon flesh remains on the rind. Leaving at least about 1/16 inch of flesh on the rind generally prevents the undesired color and flavor from occurring in the watermelon extract. The amount of watermelon flesh left on the rind usually ranges from about 1/16 inch to about ¼ inch, more typically from about 1/16 inch to about 3/16 inch, and most typically about ⅛ inch.

To further prevent removal of too much watermelon flesh, the watermelon pieces should preferably be rotated in the first finisher 60 at a slow speed. Typically, the radially extending members 84 are operated at about 180 rpm to about 600 rpm, more typically about 220 rpm to about 450 rpm, and most typically about 260 rpm to about 300 rpm. The centrifugal force created by the rotating brush assembly 82 pushes watermelon flesh and juice through the cylindrical finishing screen 80. The mixture of watermelon flesh and juice may also include some seeds depending on the size of the apertures in the cylindrical finishing screen. The apertures 93 of the cylindrical finishing screen are about ¼ inch in diameter and are equally spaced about ½ inch from one another (measured from the center of each aperture to the center of the next most adjacent aperture).

The watermelon extract collects in the receiving chamber 66 of the first finisher. Once extracted in the first finisher 60, the extract is typically pumped to a second finisher 100. Typically, one end of the first finisher 60 is elevated, so that as the watermelon extract is obtained from the watermelon pieces, gravity helps the waste pieces to fall out the bottom end of the first finisher 60 and into a waste receiving bin or waste moving auger, which transports the waste away.

Figure 6B:
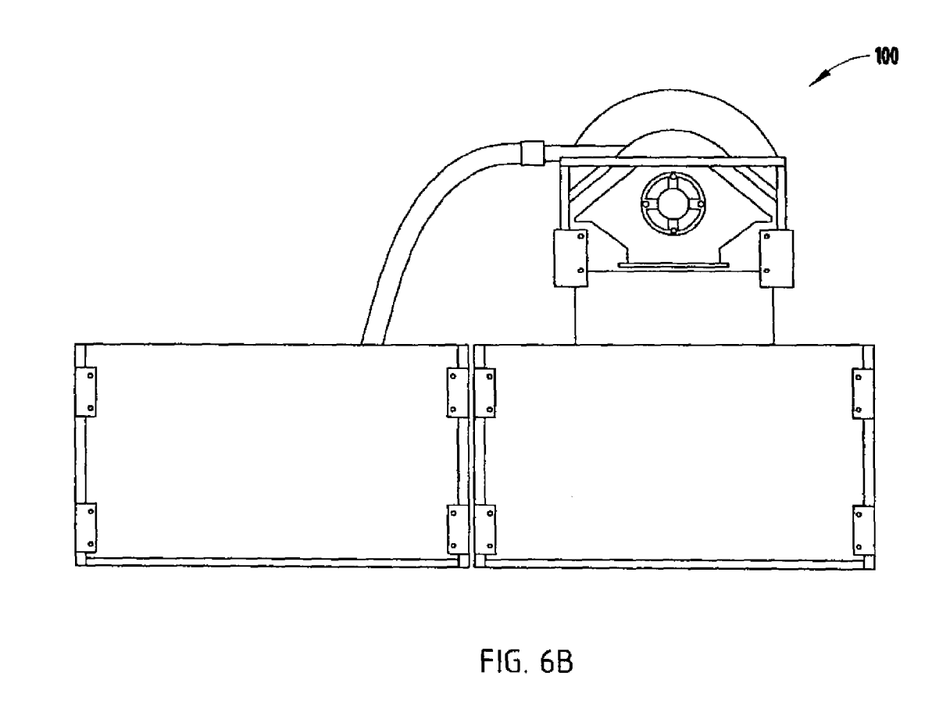
FIG. 6B is an elevational view of a second finisher of the present invention.

The second finisher 100 includes a cylindrical finishing screen with a finer mesh size than the screen in the first finisher 60 and uses centrifugal force to force the extract through the cylindrical screen of the second finisher. The second finisher 100 with the finer mesh cylindrical screen is used to remove any seeds present in the watermelon extract that may be present after the extract is initially obtained in the first finisher. While any finisher capable of removing seeds can be used, one finisher suitable for use in the process of the present invention is a BROWN™ Finisher, manufactured by Brown International Corp. of Covina Calif.

Figure 6C:
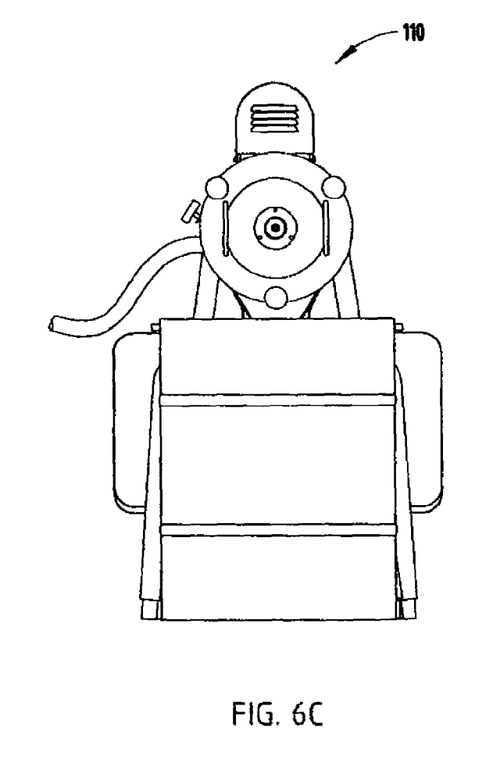
FIG. 6C is an elevational view of a filter of the present invention.
Figure 7:
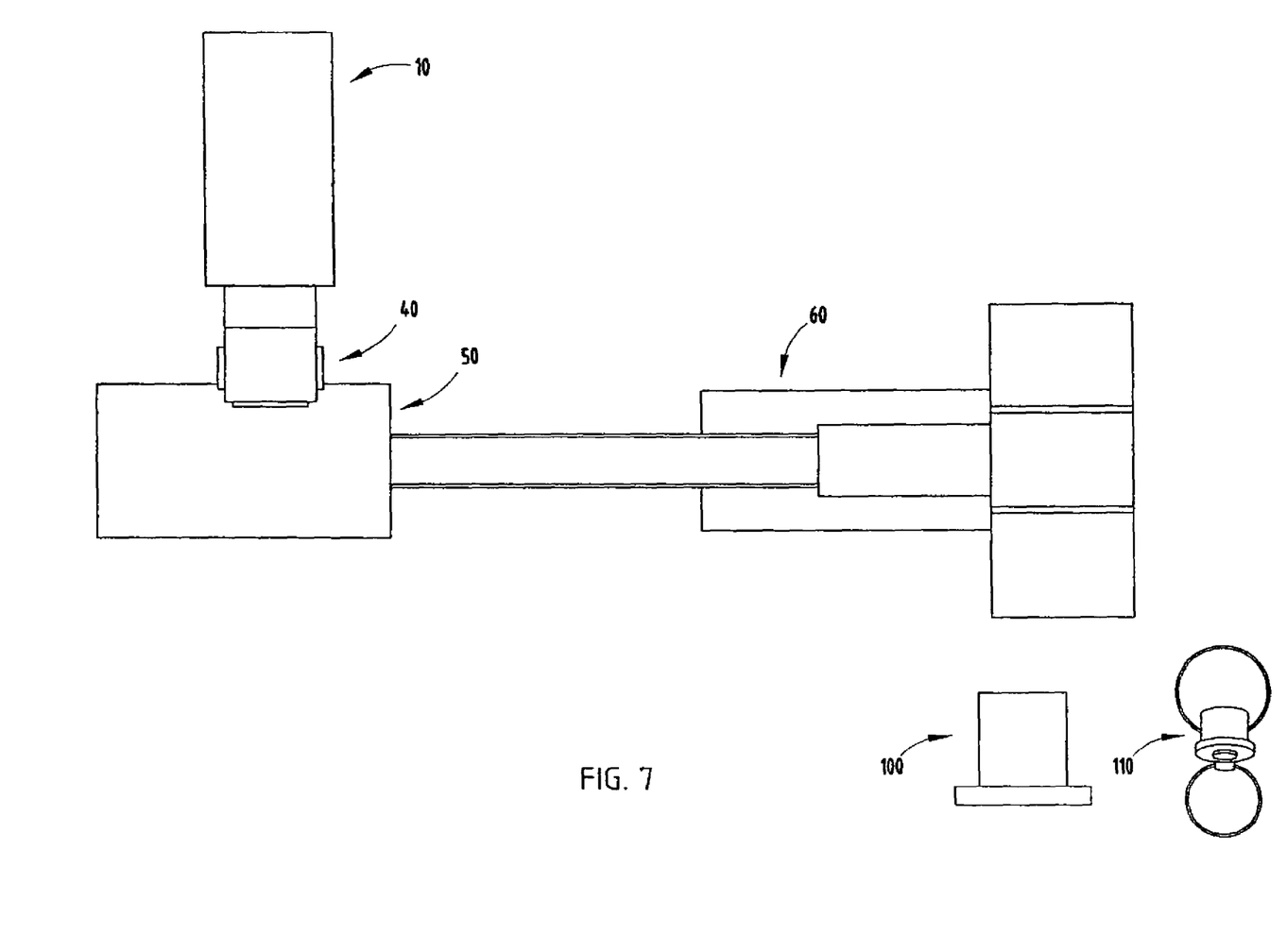
FIG. 7 is a plan view of the process of a preferred embodiment of the present invention.

The watermelon extract is then typically sent to a filter device. The filter device 110 substantially separates the watermelon flesh from the watermelon juice in the extract. The filter device 110 may be any acceptable filter, such as a SERMIA™ filter, manufactured by Sermia International Inc. of Blainville, Quebec, Canada. The SERMIA™ filter is a rotary filter which operates with a gentle centrifugal effect at a variable speed and tilt angle for separation of the solid watermelon flesh in suspension in the watermelon extract. In early testing, the filter device 110 included a screen with openings of about 80 micron to about 100 micron, most preferably being an 80 micron screen. Further testing indicates that a filter will work that uses a screen of less than 80 micron up to a screen of about 0.020" mesh size (which has approximately 510 micron size openings) depending on the desired through-put and quality required of the concentrate being made. Notably, screen sizes of 50 microns or less will remove red color in the watermelon such that most of the red color has been removed, which is undesirable in many watermelon juice products but which may be desirable in some watermelon juice products. After filtering, the watermelon extract typically includes less than about 2.5% watermelon flesh and more typically includes less than about 1.5% watermelon flesh.

From the filter device 110, the watermelon juice is typically placed in holding tanks 120 and 130. There, an edible acid is added to the watermelon juice to adjust the pH of the extract. The acid can be either an organic or inorganic acid. Typically, the acid is an organic acid, typically an FDA-approved organic acid, such as citric acid. An organic acid has been found to enhance the microbial stability of the watermelon extract. Before addition of the acid, the pH of the extract in the holding tanks 120 and 130 is about 4.6 to about 7.0. Organic acid is added to adjust the pH to about 4.2 or less. Typically, the final pH of the watermelon juice is about 3.0 to about 4.5, and more typically about 3.5 to about 4.2. Typically, from about 1 pound to about 5 pounds of organic acid per ton of raw fruit is added, more typically from about 2 pounds to about 4 pounds of organic acid per ton of raw fruit, and most typically about 2.5 pounds organic acid per ton raw fruit is added to the watermelon juice in holding tanks 120 and 130.

Once the desired pH level is achieved, the watermelon extract is sent to the evaporator 140. In the evaporator, the watermelon extract is heated to a minimum temperature of about 170° F. As the water evaporates from the extract, the water is removed under a vacuum until a predetermined Brix level is achieved, usually from about 68 to about 70 Brix such that when the essence, which has no Brix level, is returned, the end Brix level of about 65 Brix is obtained. Brix is the measurement by which the percentage by weight of soluble solids is expressed as the percent of sucrose in a solution. This measurement at 20° C. can be measured with a Brix hydrometer or with a refractometer calibrated to a Brix scale.

During a preheat stage of the evaporation process, water soluble, clear liquids, referred to as essence, are collected. Essence is the highly volatile low-esters which are the main flavor components of the watermelon juice. The strength of the essence is typically expressed in "fold" terms. For example, "100 fold" means 1 gallon of essence from 100 gallons of single strength juice. Typically, available essence is returned to the watermelon extract during the evaporation process.

After evaporation, the resulting watermelon concentrate is packaged and may optionally be frozen for storage.

The watermelon concentrate produced by the extraction process of the present invention is red in color and possesses a strong watermelon flavor identity, something obviously desired in this fruit-specific product. Unlike prior art watermelon concentrate products, the watermelon extract of the present invention does not possess a fishy odor or flavor. The fishy odor and flavor present in previous watermelon extracts are presently believed to be caused by fatty acids present in the watermelon rind. These fatty acids are generally the same as those found in fish and are what gives fish a "fishy smell." Although additives, such as colorants, sweeteners (such as sugars and artificial sweeteners such as sucralose) and flavors can be added to mask any fishy odor or smell present, it has been discovered that because of the improved flavor of the watermelon juice product of the present invention, such additives are not necessary.

Substantial separation of the red flesh interior of the watermelon from the watermelon rind while leaving a portion of the red flesh interior on the rind is presently believed to be responsible for the superior red color and more true to fruit flavor and smell associated with the watermelon extract of the present invention.

Using a HUNTER™ colorimeter, the color of the watermelon juice can be measured. The measurement of color was done using the HUNTER™ L, A, B standard color scale described below. The following test method is used in this application and examples. HUNTER™ L, A, B values are standard color scale values that indicate differences in brightness, hue, and saturation using a standard color system. The color system utilizes L values to relate lightness and a combination of A and B values to relate hue and croma on a coordinate scale. A-values represent redness-greenness and B-values represent yellowness-blueness. L-values describe the degree of brightness, where a value of 100 equals white and that of 0 equals black. A-values describe the degree of redness, which increases with an increasing A-value. B-values describe the degree of yellowness, which increases with increasing B-value. Generally, samples are placed on the sample plane of the colorimeter (which is calibrated using standard tiles according to the manufacturer's instructions) where a 45 degree incident light from a quartz-halogen lamp (clear bulb) illuminates the sample. An optical sensor placed at 0 degrees (perpendicular to the sample plane) measures the reflected light. Values are reported using a standard HUNTER™ L, A, B color scale. The L value measures the "brightness" of the juice, the A value measures the "redness", and the B value measures the "brown" in a juice. Using these values, different watermelon juices can be compared and contrasted on a quantitative basis providing real numbers in the comparison. Table 1 shows a comparison of the watermelon extract of the present invention as compared to a prior art watermelon product.

TABLE 1

| Property Measured | Prior Art Cloudy Watermelon Juice | Watermelon Extract Produced According to the Present Invention |
| --- | --- | --- |
| Brix | 61.90 | 56.6 |
| Titratable acidity | 1.54 | 1.59 |
| pH | 4.50 | 4.51 |
| HUNTER™ color at concentrate: | | |
| L value | 4.15 | 22.22 |
| A value | 17.11 | 35.73 |
| B value | 7.16 | 27.37 |

As shown in Table 1 above, the HUNTER™ color values showing the levels of brightness and red color in the prior art juice are very poor. An L value of 4.15 indicates a very dull color. An A value of 17.11 indicates very little red color associated with the juice. In reality, this analytical information points to more of an amber/yellow color typically associated with apple juice than watermelon juice. In contrast, the color results of the watermelon juice of the present invention show vastly greater brightness and red values. As can be seen in Table 1, the L value of the juice of the present invention is more than five times the L value of the prior art juice, more particularly 18.07 points higher. The A value of the juice of the present invention is twice the L value of the prior art, more particularly 18.62 points greater. The B value is 20.21 points higher in the watermelon extract of the present invention. Visually, the watermelon juice of the present invention is bright and red, just what one would expect in a quality watermelon juice. Typically, the watermelon juice of the present invention typically has an L value of about 19 to about 24, more typically from about 21 to about 23, and most typically about 22. The watermelon juice typically has an A value of from about 32 to about 37, more typically from about 34 to about 36, and most typically about 35. The watermelon juice typically has a B value of about 24 to about 30, more typically from about 26 to about 28, and most typically about 27.

The watermelon concentrate or other extract of the present invention typically contains a TPC of bacteria of less than about 1000/g, more typically less than about 700/g, and most typically less than about 500/g watermelon juice.

Watermelon juice, juice (cloudy or clarified) concentrate, or other extract can be used in a myriad of food products, including beverages, sorbet, yogurt, sauces, salad dressings, fruit salad desserts, bakery fillings, candy, and bar mixes.

The process and watermelon juice concentrate as described herein is directed to a cloudy watermelon juice. However, those skilled in the art will appreciate that the process of the present invention can also be used to produce clarified watermelon juice.

To prepare clarified juice, the cloudy juice is typically strained using clean press cloths, a rotating screen, or a vibrating-type shaker screen. After straining, the juice may be further clarified using one of the following methods: enzymatic, bentonite, gelatin-tannin, and electrokinetic absorption. The enzymatic method involves heating the juice and then adding pectolytic enzymes, which break down the natural pectin in the juice. In the bentonite method, the juice is heated to approximately 190° F., held for a few seconds, and then cooled rapidly. Then, typically a mixture of equal parts of bentonite and filter aid are added to the juice. The heat treatment coagulates colloidal material in the juice. The bentonite/filter aid mixture causes the coagulated colloidal material to flocculate, which is then filtered. In the gelatin-tannin method, gelatin is dissolved in water and then added to the cloudy juice. The gelatin combines with the tannins in the juice to form a precipitate. The juice is clarified when the precipitate settles out and pulls suspended fruit material in the juice down with it. The electrokinetic adsorption method uses a cartridge filter. The cartridge filter provides electrokinetic adsorption and small-pore mechanical straining. The filter medium is composed of cellulose and polymer fibers, which impart a positive charge. After the juice is clarified, it is mixed with a filter aid, such as diatomaceous earth or siliceous powder. It is then filtered through a filter cloth or filter paper. The filter aid along with the fruit material separated during the clarification process is caught on the filter cloth or filter paper.

Figure 8:
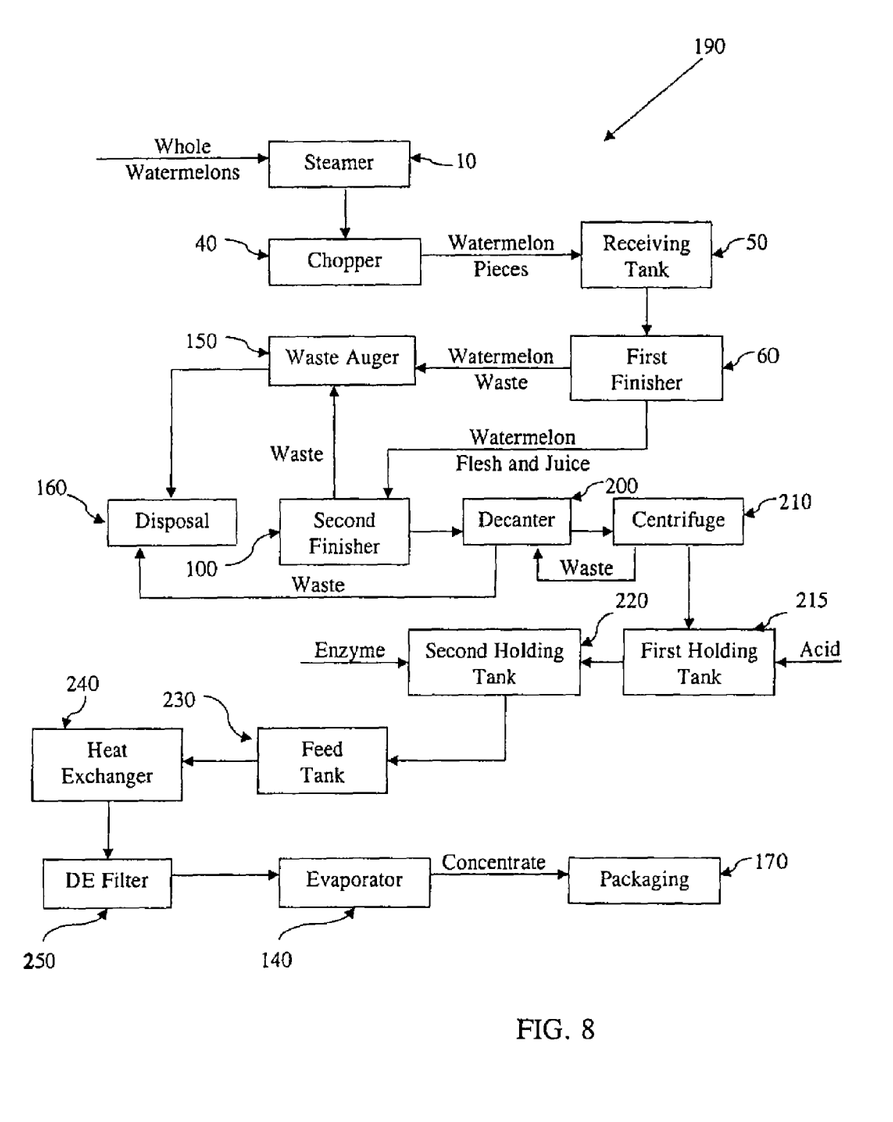
FIG. 8 is a flow diagram illustrating a process of producing clarified watermelon concentrate in accordance with the present invention.

As shown generally in FIG. 8, the process of producing clarified watermelon concentrate 190 of the present invention generally utilizes the same process as producing cloudy watermelon extract up until the watermelon extract has passed through the second finisher 100. Thereafter, instead of proceeding to a filter and being processed further as generally shown in FIG. 1, the extract is moved to a decanter (hold tank) 200 and the waste product is placed in drums. Next, the liquid extract is centrifuged 210 and the waste returned to the decanter hold tank.

The product from the centrifuge is transported or otherwise moved to a first holding tank 215 where, as in the process for preparing a cloudy extract, an organic acid, typically citric acid, is added to lower the pH to at least about 4.2 or less, typically to about 4.0. Typically, the same amount of acid per ton of raw fruit as used in lowering the pH of cloudy extract is also used to lower the pH at this stage as well. The extract in holding tank 215 is typically moved to a second holding tank 220. About 3 oz. of a pectin enzyme, such as ADEX G enzyme, per 2,000 gallons of extract is added. The blend is held for about ½ hour.

Once treated with the pectin enzyme and the pH has been adjusted, the enzyme-treated extract is moved or otherwise transported to feed tank 230. The feed tank feeds the extract into a regeneration heat exchanger 240. The regeneration heat exchanger heats the extract to about 180° F., which causes the remaining cloudy portion of the extract to form discrete masses or clumps of cloudy material. The extract is then cooled to a temperature of from about 40° F. to about 50° F. The extract with the discrete masses is then passed through a diatomaceous earth (DE) filter 250, which removes the discrete masses from the extract. The thermal processing of the extract in the temperature line heater facilitates the removal of the cloudy portion of the extract by the diatomaceous earth filter by forming the larger masses of cloudy material. Thereafter, the clarified (colorless or at least substantially colorless) extract is then typically evaporated and packaged as discussed above regarding the production of the cloudy concentrate. The clarified extract typically has a Brix of about 65, a pH of from about 3.8 to about 4.5, an acidity of from about 1.0 to about 3.0% by weight as citric at 65 Brix. The clarity of the clarified extract is typically at least about 80% transmittance at 625 nm, 7.8 Brix. The color of the clarified extract is about 35% or less transmittance at 440 nm, 7.8 Brix. The total plate count of the clarified extract is typically less than about 500/g.

Testing has shown that the present apparatus and process can be used on melons other than watermelon, such as cantaloupe and other muskmelons, and honeydew melons, In such case, the machinery and process can be adapted/adjusted for the particulars of the melon being processed . . . such as by adjusting or changing the equipment to remove more (or less) flesh from the rind (including changing piece sizes of rind parts), adjusting or changing equipment for different processing speeds and for different levels of filtering to obtain a desired quality of juice product and adjusting the equipment for optimal operating temperatures and steam pressures for a particular fruit.

For cantaloupe melon, the same process can be used as described above. However, testing has shown that plugging of screens can be a problem and must be appropriately managed. For example, cantaloupe may be "green" on day 1, acceptably ripe on days 2-3, and overripe or rotten on day 4. "Green" cantaloupe may result in small balls that plug openings in a screen. "Overripe" cantaloupe may result in rind that is leathery such that it tends to generate long strips that plug openings in screens. This can be controlled in part by controlling a quality of melon put into the equipment, but also can be helped by providing screens with larger opening sizes, slower through-put, and lower operating temperatures. In particular, steaming the cantaloupe to remove bacteria may also need to be adjusted since cantaloupe tend to be affected by steam more quickly (due to their smaller size and also due to their thinner, different rind), such that the steam temperature, force, locations of application, and/or total time of steam treatment may need to be adjusted downward. The present apparatus and process for watermelon can be modified to deal with these items such as by providing a cutter or disintegrator that reduces the cantaloupe to pieces to a smaller size than watermelon. For cantaloupe, it is preferred that the chopped pieces be a maximum of 4"×6"×½" in size, or more preferably be about 1"×1"×¼" in size. The cantaloupe is moved to the disintegrator by an auger that is shaped and adapted to move the cantaloupe at a slower pace than watermelon and without unacceptable smashing, so that the pieces (including bits of rind) are not turned into a puree-like substance. Generally, a similar amount of flesh (i.e., about 1/16") can be left on the cantaloupe rind (as compared to watermelon) when separating the flesh from the rind, but it is noted that perhaps slightly more flesh can be removed without compromising taste and juice quality. Notably, cantaloupe juice is not normally concentrated, such that the collected juice is placed in storage containers and frozen without concentrating steps. The cantaloupe piece is not heated in the evaporator. Applicants have found that the heat of the evaporator substantially eliminates the flavor of the juice.

For honeydew melon, the machinery and process are more similar to processing of watermelon. Nonetheless, even here, parameters and equipment potentially need to be adjusted or adapted for particular characteristics and properties of the honeydew melon. For example, honeydew melon break apart in a slightly different manner than watermelon. Honeydew melon generally break apart with less of an "exploding" action such as is found in watermelon. This is affected by ripeness of the melon, rind thickness, size of the fruit, and particular family types of honeydew melons, as well as by the faster effect of steam cleaning on the honeydew melon.

It is contemplated that other melons with rinds can be processed for extracting juice by the present apparatus and method through fine-tuning and adjusting the equipment and operating parameters, as discussed above.

In the foregoing description, it will be readily appreciated by those skilled in the art that modifications may be made to the invention without departing from the concepts disclosed herein, Such modifications are to be considered as included in the following claims, unless these claims by their language expressly state otherwise.

What is claimed:

1. A process of producing a melon extract comprising the following steps:
    providing at least one whole melon comprising flesh;
    steaming the outside surface of the whole melon to thereby soften the outside surface of the melon and remove microbials from the outside surface of the melon;
    reducing the size of the whole melon to form melon pieces that include melon flesh only, melon rind only and melon flesh and melon rind; and
    introducing the melon pieces into the first finisher and utilizing the finisher to remove the melon flesh from the melon pieces having melon flesh and melon rind such that at least from about 1/16 inch of flesh remains on the melon pieces having melon flesh and melon rind thereby forming a melon extract from the flesh that is removed from the melon pieces that include melon flesh and not rind; and wherein the steps of steaming the outside surface of the whole melon, reducing the size of the whole melon to form melon pieces and introducing the melon pieces into the first finisher is done in a continuous process.

2. The process of claim 1, wherein the step of reducing the size of the whole melon to form melon pieces comprises applying pressure on the whole melon to reduce the size of the melon to smaller than about 16 inch square.

3. The process of claim 1, wherein the step of reducing the size of the whole melon comprises introducing the whole melon into a chopper comprising a rotating drum having teeth on the surface of the drum.

4. The process of claim 3, wherein the whole melon comprises a watermelon and the melon extract comprises a watermelon extract having the following colorimeter values: an L value of about 19 or greater, an A value of about 32 or greater, and a B value of about 24 or greater.

5. The process of claim 1, wherein the whole melon comprises a whole watermelon and the whole watermelon is reduced to a size of about 16 inches square or smaller.

6. The process of claim 1, wherein the whole melon comprises a whole cantaloupe and wherein the step of reducing the size of the whole melon comprises reducing the size of the whole cantaloupe to form pieces having a maximum size of about 4 inches by six inches by one half inch.

7. The process of claim 1, wherein the whole melon comprises a whole melon chosen from the group consisting of a whole honeydew melon, a whole cantaloupe, and a whole watermelon.

8. The process of claim 1, wherein the step of steaming the outside surface of the whole melon comprises utilizing a steamer comprising a rotatable steam cylinder assembly that includes a main cylinder frame and at least one steam line positioned such that steam from the steam line(s) is directed toward the main cylinder frame and such that steam contacts the outside surface of the whole melon(s) when the whole melon(s) are located within at least a portion of the rotatable steam cylinder assembly; and
    placing the whole melon into one end of the rotatable steam cylinder assembly and conveying the melon from one end of the cylinder assembly toward the other end of the cylinder assembly while steaming the outside surface of the melon to thereby soften and disinfect the melon.

9. The process of claim 8, wherein the rotatable steam cylinder assembly further comprises a drive belt assembly frictionally engaged to the outside surface of the main cylinder frame and a motor, which cooperate to rotate the main cylinder frame and a reverse auger that operates to transport the whole melons from a first end of the rotatable steam cylinder assembly to a second end of the rotatable steam assembly when in operation and rotating the main cylinder frame at a rate such that the melons are held inside the steamer for from about 30 to about 90 seconds.

10. The process of claim 9, wherein the steamer further comprises a housing, at least a portion of the rotatable steam cylinder assembly is positioned within the housing, and the steamer comprises a plurality of steam lines positioned within the housing and beneath the rotatable steam cylinder assembly.

11. The process of claim 10, wherein the main cylinder frame comprises a plurality of apertures from about 2 inches to about 8 inches wide and from about 4 inches to about 14 inches long arranged around the circumference of the main cylinder frame and form parallel rings that extend down the length of the cylinder positioned from about one to about 12 inches apart such that the steam lines deliver steam into contact with the whole melons by passing steam through the plurality of apertures.

12. The process of claim 9, wherein the first finisher comprises two sets of four brushes each individually engaged to an end of a radially extending member and the opposite end of the radially extending member is engaged to a central shaft and wherein the radially extending members and brushes are spaced at about 90 degrees from one another about the central shaft and wherein the brushes comprise bristles having tips and the distance between the tips of the bristles and a cylindrical finishing screen is from about 3/4 inch to about one inch and wherein the centrifugal force created by the brushes rotating at speeds of from about 180 rpm to about 600 rpm pushes watermelon flesh and juice through the cylindrical finishing screen.

13. The process of claim 1, wherein the first finisher comprises: a receiving chamber for receiving melon extract; and a finishing cylinder assembly comprising a cylindrical finishing screen and rotatably moveable finishing brushes operatively connected to a central shaft and wherein the brushes and the finishing screen cooperate with one another to extract the melon extract from the melon pieces.

14. The process of claim 1 further comprising the steps of introducing the melon extract into a second finisher comprising a cylindrical finishing screen; and using centrifugal force to force the melon extract through the cylindrical screen to form a filtered melon extract.

15. The process of claim 11, wherein the melon extract is filtered until the melon extract comprises less than about 2.5% melon flesh.

16. The process of claim 15, wherein the melon extract is at least substantially free of seeds.

17. The process of claim 15 further comprising the step of adding an organic acid to the melon extract.

18. The process of claim 17, wherein the melon extract is a watermelon extract and the process further comprises the steps of heating the watermelon extract and removing water from the watermelon extract under a vacuum to form a watermelon concentrate.

19. The process of claim 18, wherein water from the watermelon extract is removed until the Brix level is from about 68 to about 70 Brix and further comprising the step of adding essence of the watermelon to the watermelon concentrate until the mixture of concentrate and essence has a Brix of about 65.

20. A process of producing a watermelon extract comprising the steps of:
providing at least one whole watermelon comprising flesh;
steaming the outside surface of the whole watermelon at a temperature from about 220° F. to about 338° F. using a steamer comprising a rotatable steam cylinder assembly that includes a main cylinder frame; a drive belt assembly frictionally engaged to the outside surface of the main cylinder frame; a motor; and at least one steam line positioned such that steam from the steam line(s) is directed toward the main cylinder frame and such that steam contacts the outside surface of the whole watermelon(s) when the whole watermelon(s) are located within at least a portion of the rotatable steam cylinder assembly; wherein the steps of steaming the outside surface of the whole watermelon includes placing the whole watermelon into one end of the rotatable steam cylinder assembly and conveying the watermelon from one end of the cylinder assembly toward the other end of the cylinder assembly using a reverse auger wherein the drive belt assembly frictionally engaged to the outside surface of the main cylinder frame and the motor cooperate to rotate the main cylinder frame while the watermelon is being transported within the steamer and wherein steaming the outside surface of the watermelon thereby softens and disinfects the melon;
reducing the size of the whole watermelon to form watermelon pieces about 16 inches square or smaller;
introducing the watermelon pieces into the first finisher comprising:
a receiving chamber for receiving watermelon extract; and
a finishing cylinder assembly comprising:
a cylindrical finishing screen; and
rotatably moveable finishing brushes operatively connected to a central shaft by radially outwardly extending members; wherein the brushes and the finishing screen cooperate with one another to extract the watermelon extract from the watermelon flesh of the watermelon pieces such that at least from about 1/16 inch of flesh remains on the watermelon pieces that contain watermelon flesh and watermelon rind when the watermelon pieces are removed from the first finisher and thereby form watermelon extract from the watermelon flesh;
collecting the watermelon extract produced from the watermelon flesh;
introducing the collected watermelon extract into a second finisher comprising a cylindrical finishing screen; and using centrifugal force to force the watermelon extract through the cylindrical screen to form a filtered watermelon extract; and
adding an organic acid to the filtered watermelon extract to form a blend until the blend comprises a maximum pH of about 4.5; and wherein the blend comprises the following colorimeter values, an L value of about 19 or greater, an A value of about 32 or greater, a B value of about 24 or greater; and wherein the steps of steaming the outside surface of the whole melon, reducing the size of the whole melon to form melon pieces and introducing the melon pieces into the first finisher is done in a continuous process.

21. The process of claim 20, wherein the filtered watermelon extract comprises less than about 1% melon flesh and the filtered watermelon extract is at least substantially free of colorants, added flavor components, and added sweeteners.

22. A process of producing a melon extract comprising the following steps:
providing at least one whole melon comprising flesh;
steaming the outside surface of the whole melon to thereby soften and disinfect the melon;
reducing the size of the whole melon to form melon pieces about 16 inches square or smaller;
introducing the melon pieces into the first finisher and utilizing the finisher to remove the melon flesh from the melon pieces having melon flesh and melon rind such that at least from about 1/16 inch of flesh remains on the melon pieces having melon flesh and melon rind and thereby forming a melon extract; and
concentrating the melon extract to form a melon concentrate at least five to ten times stronger than the melon extract; and wherein the steps of steaming the outside surface of the whole melon, reducing the size of the whole melon to form melon pieces and introducing the melon pieces into the first finisher is done in a continuous process.

23. The process of claim 22, wherein the whole melon comprises a watermelon, the melon pieces comprise watermelon pieces, the melon extract comprises a watermelon extract, and the melon concentrate comprises a watermelon concentrate and wherein the step of steaming the outside surface of the whole melon uses steam at a temperature of from about 220° F. to about 338° F.

* * * * *